(12) United States Patent
Kazmi et al.

(10) Patent No.: US 10,530,556 B2
(45) Date of Patent: Jan. 7, 2020

(54) FULL-DUPLEX POWER REPORTING

(71) Applicant: TELEFONAKTIEBOLAGET LM ERICSSON (PUBL), Stockholm (SE)

(72) Inventors: Muhammad Kazmi, Sundbyberg (SE); Gabor Fodor, Hässelby (SE); Dennis Hui, Sunnyvale, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 37 days.

(21) Appl. No.: 15/554,121

(22) PCT Filed: Mar. 5, 2015

(86) PCT No.: PCT/SE2015/050249
§ 371 (c)(1),
(2) Date: Aug. 28, 2017

(87) PCT Pub. No.: WO2016/140607
PCT Pub. Date: Sep. 9, 2016

(65) Prior Publication Data
US 2018/0041326 A1    Feb. 8, 2018

(51) Int. Cl.
| H04L 5/14 | (2006.01) |
| H04L 12/24 | (2006.01) |
| H04W 52/36 | (2009.01) |

(52) U.S. Cl.
CPC ............. *H04L 5/14* (2013.01); *H04L 5/1423* (2013.01); *H04L 41/0803* (2013.01); *H04W 52/365* (2013.01)

(58) Field of Classification Search
CPC .......................... H04W 52/365; H04L 41/0803
See application file for complete search history.

(56) References Cited

U.S. PATENT DOCUMENTS

2011/0158137 A1* 6/2011 Tam .................... H04L 5/1423
                                                                    370/282
2012/0218904 A1* 8/2012 Narasimha ............ H04L 5/001
                                                                    370/248
(Continued)

FOREIGN PATENT DOCUMENTS

GB           2499259 A      8/2013
WO       2012095683 A1      7/2012

OTHER PUBLICATIONS

Advanced LTE, 3GPP; "3rd Generation Partnership Project; Technical Specification Group Services and System Aspects; Feasibility study for Proximity Services (ProSe) (Release 12)"; 3GPP TR 22.803 V12.2.0 Technical Report; Jun. 2013; pp. 1-45.
(Continued)

*Primary Examiner* — Gary Mui
(74) *Attorney, Agent, or Firm* — Patent Portfolio Builders, PLLC

(57) ABSTRACT

There is disclosed a method for operating a wireless device of a wireless communication network, the wireless device being capable of full-duplex communication, FD communication, on one or more carriers, FD carriers. The method comprises determining a power report indicating transmission power available to the wireless device for FD communication on one or more of the FD carriers and providing the power report to the wireless communication network. Moreover, there are disclosed corresponding and complementary methods and devices.

18 Claims, 7 Drawing Sheets

(56) References Cited

U.S. PATENT DOCUMENTS

2013/0052188 A1* 2/2013 Min ................... A61M 1/3472
424/130.1
2016/0020894 A1* 1/2016 Tetzlaff ................ H04L 5/1461
370/278

OTHER PUBLICATIONS

International Search Report and Written Opinion dated Oct. 19, 2015 in related International Application No. PCT/SE2015/050249.
Office Action issued in application No. 15716893.1, dated Jul. 24, 2018; 4 pages.
Office Action issued in application No. 15716893.1, dated Dec. 7, 2018; 4 pages.

* cited by examiner

FULL-DUPLEX POWER REPORTING

TECHNICAL FIELD

The present disclosure pertains to full-duplex power reporting in wireless communication networks.

BACKGROUND

A wireless device for a wireless communication network is often adapted to communicate in half-duplex (HD) mode or communication, in which it may either receive or transmit on a given carrier, but not both at the same time on the same carrier. In some cases, a wireless device may be adapted to communicate in full-duplex (FD) mode or communication, in which it may receive and transmit on the same carrier simultaneously. This may cause self-interference effects in the wireless device operating in full-duplex. To mitigate such effects, the transmission conditions for full-duplex communication, in particular in regards to transmission power, may differ from those in half-duplex operation.

SUMMARY

It is an object of the present disclosure to provide solutions allowing improved operation of wireless devices capable of full-duplex communication.

Accordingly, there is described a method for operating a wireless device of a wireless communication network, the wireless device being capable of full-duplex communication, FD communication, on one or more carriers, FD carriers, wherein FD communication on a carrier comprises simultaneous transmission and reception on this carrier. The method comprises determining a power report indicating transmission power available to the wireless device for FD communication on one or more of the FD carriers, and providing the power report to the wireless communication network.

There is also described a wireless device for a wireless communication network. The wireless device is adapted for full-duplex communication, FD communication, on one or more carriers, FD carriers, wherein FD communication on a carrier comprises simultaneous transmission and reception on this carrier. The wireless device is further adapted for determining a power report indicating transmission power available to the wireless device for FD communication on one or more of the FD carriers, and for providing the power report to the wireless communication network.

Moreover, a method for operating a network node of a wireless communication network is suggested. The method comprises receiving, from a wireless device, a power report, the power report indicating a transmission power available to the wireless device for full-duplex communication, FD communication, on one or more carriers, FD carriers, wherein FD communication on a carrier comprises simultaneous transmission and reception on this carrier, and configuring one or more wireless devices for communication based on the power report.

A network node for a wireless communication network is proposed, the network node being adapted for receiving, from a wireless device, a power report, the power report indicating a transmission power available to the wireless device for full-duplex communication, FD communication, on one or more carriers, FD carriers, wherein FD communication on a carrier comprises simultaneous transmission and reception on this carrier. The network node is adapted for configuring one or more wireless devices for communication based on the power report.

In addition, a program product including code executable by control circuitry is described, the code causing the control circuitry to control and/or perform any one of the methods described herein when executed by the control circuitry.

A storage medium storing a code of such a program product is envisioned.

Moreover, there is described an arrangement comprising at least one wireless device as described herein and one network node as described herein, in particular carrying out any method or any combination of methods described herein.

The approaches suggested allow the network to be informed about the power available for FD communication, facilitating better control and operation of a wireless device adapted for FD communication (also referred to as FD capable device).

DETAILED DESCRIPTION

Figure 1:
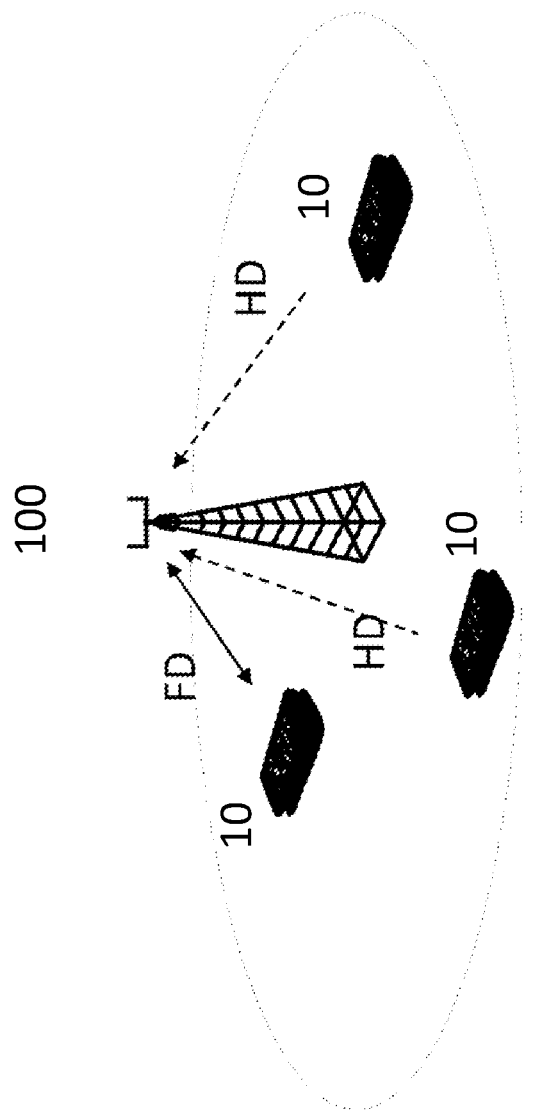
FIG. 1 shows a schematic example of a wireless communication network.

In the context of this disclosure, a wireless communication network may be a network of devices or nodes allowing wireless communication between nodes or devices of and/or connected to the network. A wireless communication network may in particular be a mobile and/or cellular communication network. Wireless communication in a wireless communication network may be performed according to one or more technical standards, in particular LTE (Long Term Evolution, a telecommunications standard) and/or a 5G standard (upcoming telecommunications standard of the 5th generation, may succeed or supplement LTE). Generally, communication, in particular wireless communication, may comprise transmission of signals or data and/or reception of data or signals. A wireless communication network may comprise one or more network nodes, in particular radio nodes adapted for wireless communication with one or more wireless devices. A network node or radio node adapted for controlling the wireless communication of or with one or more wireless devices, e.g. by configuring the wireless devices and/or scheduling resources, may be considered a control node. A wireless communication network may comprise and/or be connected to a core network, which may provide control and/or information transport functionalities. A network node, in particular a radio node, may comprise control circuitry and/or radio circuitry and/or comprise and/or be connected or connectable to antenna circuitry. A network node may in particular be a control node and/or a base station and/or an eNodeB. A wireless communication network may generally utilize one or more RATs (Radio Access Technology), e.g. LTE, UMTS, WLAN/WIFI, etc.

Wireless communication may utilize electromagnetic radiation, in particular one or more types of carrier waves carrying the information to be communicated. The term carrier may generally refer to and/or have assigned to it a frequency or a frequency band of such carrier waves, in particular within a radio band. The carrier/s used for wireless communication may be defined according to the standard used for communication and may be referred to by indices or placeholders instead their physical characteristics according to this standard. Sometimes, a carrier, respectively the frequency band assigned to it, is subdivided into so-called subcarriers, which are to be considered as forms of carriers in the context of this specification. Two carriers may be considered to be the same if their frequency bands overlap or significantly overlap or are the same. Two carriers may be considered to significantly overlap in particular if their frequency bands overlap to at least 30% and/or the central frequency or a bandwidth of 30% of the bandwidth of one of the carriers around the central frequency overlaps with and/or is covered by the frequency band of the other carrier.

A wireless device may be any device adapted to communicate wirelessly with or within a wireless communication network, in particular using one or more carriers. Examples of wireless devices include mobile terminal, smartphone, user equipment, PDA, tablet, portable computer, smartwatch, etc. In the following, the terms user equipment and wireless device may be used interchangeably. A wireless device may be adapted for communicating on one or more carriers, e.g. by comprising suitable radio circuitry and/or control circuitry. In particular, a wireless device may be adapted for and/or capable of full-duplex communication on one or more carriers, which may be called FD carriers.

A wireless device may be adapted to provide a power report, for example a Power Headroom Report (PHR). A power report may generally indicate how much power or energy (or how much more power or energy) a wireless device would be able to transmit within a given timescale, which may be a scheduling time interval, e.g. a subframe or frame.

A power report may indicate on how many more uplink PRBs the wireless device would be able to transmit. It may be considered that a power report pertains to and/or comprises one or more measurement reports, in particular pertaining to received signals, e.g. based on measurements on reference or pilot signals, which may be received from the network or network node, e.g. RSRP, RSRQ, RSSI.

The wireless device may be configured or configurable, e.g. by the network or network node, for providing (and/or determining) such a report/s. A report may generally comprise one or more messages and/or may be split up into several separate reports or subreports, e.g. based on a configuration and/or according to a standard. The power report may be determined and/or provided based on a power report configuration, which may be configured or configurable by the network or network node. Generally, reporting (e.g., including a report) and/or messages and/or signaling triggered by and/or due to or based on a common or the same triggering condition or providing condition (respectively, a corresponding event), may be considered to be part of the same report, even if consisting of several parts.

It may be considered that the wireless device is provided with and/or subject to and/or has a (total) power limit and/or a set of power limits for a given timescale or transmission occasion (and/or operation mode like FD and/or HD), which may be determined (pre-determined) e.g. depending on transmission frequency or carrier, regulatory requirements, power supply, capability of circuitry of the wireless device, in particular radio and/or antenna circuitry (e.g. in terms of gain/amplification), operating conditions, e.g. Signal-to-Interference/Noise Ratio, self-interference suppression capability (in particular in the context of FD), etc.

A power report indicating available transmission power may indicate a total transmission power, and/or the transmission power used (e.g., in dependence of resources/carriers used), for example during a current transmission occasion and/or a scheduled transmission occasion, and/or the transmission power available, e.g. based on the total available power and the transmission power used. A total available power or total power may represent a maximum power for transmission, according to an above-mentioned limit, e.g. referring to a time interval and/or corresponding transmission occasion.

Available power may represent the power still available (e.g. in the time interval and/or transmission occasion), after considering power already assigned and/or used and/or configured and/or scheduled. The available power maximally can be the total power or total available power. Generally, the total power and available power may in particular be different for FD communication and HD communication and/or be dependent on duplex mode (generally FD or HD) and/or be the carrier/s.

It may be considered that a wireless device is adapted for half-duplex (HD) communication (e.g. transmission or reception) on one or more carriers (HD carriers), which may include some or all of the FD carriers of the wireless device.

Accordingly, a wireless device may be capable of HD and FD communication on some carriers (selective or switchable, either HD or FD at a given time). Generally, HD communication or operation or mode refers to communication utilizing or setting a (specific) carrier for either transmission or reception, but not both, at the same time (pertaining to one device, like a wireless device). FD communication or operation or mode refers to communication utilizing or setting a (specific) carrier for transmission and reception at the same time or simultaneously.

A wireless device may be adapted to configure itself (at least partly) based upon a configuration, which may be received from and/or provided by, a network or network node. In particular, a wireless device may configure one or more itself for FD operation or communication or HD operation or communication based on such a configuration (e.g. a duplex or FD or HD configuration), in particular for one or more carriers available for both HD and FD communication, e.g. by switching between FD and HD or vice versa.

In other words, for a wireless device, a carrier may be a HD carrier and FD carrier, respectively be switchable between these functions, depending on the communication mode (HD or FD) the wireless device operates in. On a carrier available for both HD and FD to the wireless device, the wireless device may either use HD communication (reception or transmission) or FD communication.

It may be considered that a wireless device may switch between HD communication and FD communication on such carriers, e.g. based on a configuration or operating conditions. A wireless device generally may comprise control circuitry and/or radio circuitry and/or comprise and/or be connected or connectable to antenna circuitry.

Examples of HD transmission and reception schemes include half duplex frequency division duplexing (HD FDD) and time division duplexing (TDD) that enable separating the transmitted and received signals at a radio transceiver either in frequency or in time or in both.

Full duplex frequency division duplexing (FD FDD) enables simultaneous transmission and reception of radio signals, but the transmission and reception of radio signals take place on different carrier frequencies; thus FD FDD is rather a form of half duplex communication. In contrast, full duplex (FD) communication enables simultaneous transmission and reception of radio signals on the same carrier/carrier frequency. Some variants of HD communication, which the wireless device may perform and/or be adapted for, include one or more of HD-TDD (Time Division Duplexing), wherein the transmission and reception of radio signals takes place on the same carrier but in different times or time resources; and/or HD-FDD (Frequency Division Duplexing), wherein the transmission and reception of radio signals takes place on the same carrier but in different times or time resources, and/or FD-FDD, wherein the transmission and reception of radio signals takes place on different carriers but during the same time or time resources, and/or HD in time and frequency, where the transmission and reception of radio signals takes place on different carriers and also during different times and time resources.

FIG. 1 schematically shows an example of a wireless communication network in which a network node 100 (base station) communicates with wireless devices 10. The communication type (FD or HD) is indicated at the lines symbolizing the communication link. It should be noted that in general, a wireless device may communicate with one or more carriers in HD and one or more other carriers in FD at the same time, e.g. with one or more network nodes, and/or in one or more cells, and/or within one or more networks.

Generally, the wireless device may be adapted for self-interference (SI) suppression (also referred to cancellation) to limit or lower SI effects for one or more than one of the FD carriers and/or it may have a corresponding capability. For example, a wireless device may comprise analog cancellation circuitry (e.g. balun circulator), e.g. operating at radio frequency, and/or a digital cancellation module, which may operate at a baseband frequency, for SI suppression. However, it is likely that even with SI suppression capability, a significant SI effect may be observed by receiving circuitry in FD communication. For example, assuming a transmitted signal of 100 mW transmit power and a noise floor at around −90 dBm, the SI seen by a receiving circuitry on a carrier caused by the transmission on the same carrier must be cancelled by ~90 dB to reduce the SI to a similar level as the noise floor (assuming that commercial isolators provide ~20 dB of TX/RX (transmitter/receiver) isolation). Even if this may be technically possible to achieve, the cost currently would be prohibitive. Therefore, a significant SI effect may be expected for comparable transmission powers (between HD and FD). A wireless device may generally transmit, and/or be adapted for transmitting and/or comprise a capability module for transmitting, capability information to a network or network node. Capability information may generally comprise information on which carriers and/or channels a wireless device may use which duplex mode, and/or maximum or total transmit power for FD and/or HD communication, and/or supported modulation and coding schemes (MCS) for FD communication and/or HD communication and/or a maximum number of physical channels (and/or PRBs) it can transmit on for the largest values of available power, in particular total available power and/or FD-PHR and/or HD-PHR. A channel generally may be a physical and/or logical channel, for example as defined by a standard used. Resources may be assigned to and/or scheduled for a channel, e.g. by a network and/or network node. The capability information may be registered with the network node and/or network by transmitting.

There is disclosed a method for operating a wireless device of a wireless communication network. The wireless device is capable of full-duplex communication, FD communication, on one or more carriers, FD carriers. The method comprises determining a power report indicating transmission power available to the wireless device for FD communication on at least of the FD carriers and providing the power report to the wireless communication network, e.g. a network node like a control node or base station or eNodeB. Accordingly, the wireless device may inform the network about the power it may put into FD transmission, allowing the network improved control and scheduling of resources based on the power report.

A wireless device for a wireless communication network is disclosed. The wireless device is adapted for, and/or may comprise a full-duplex module for, full-duplex communication, FD communication, on one or more carriers, FD carriers. Moreover, the wireless device is adapted for, and/or may comprise a power report module for, determining a power report indicating transmission power available to the wireless device for FD communication. The wireless device in addition may be adapted for, and/or comprise a reporting module for, providing the power report to the wireless communication network. The wireless device in particular may be a user equipment.

There is also disclosed a method for operating a network node of a wireless communication network. The method comprises receiving, from a wireless device, a power report, the power report indicating a transmission power available to the wireless device for full-duplex communication, FD communication, on one or more carriers, FD carriers. The method may comprise configuring one or more wireless devices for communication based on the power report.

Furthermore, a network node for a wireless communication network is described. The network node is adapted for, and/or may comprise a report receiving module for, receiving, from a wireless device, a power report, the power report indicating a transmission power available to the wireless device for full-duplex communication, FD communication, on one or more carriers, FD carriers. The network node may further be adapted for, and/or comprise a configuring module for, configuring one or more wireless devices for communication based on the power report. The network node may be a base station or control node or eNodeB.

There is envisioned a program product including code executable by control circuitry, the code causing the control circuitry to control and/or perform any of the methods described herein when executed by the control circuitry.

Moreover, a storage medium storing a code of such program product and/or the program product is disclosed. A storage medium may generally be computer-readable and/or accessible and/or readable by control circuitry (e.g., after connecting it to a suitable device or interface), and may comprise e.g. an optical disc and/or magnetic memory and/or a volatile or non-volatile memory and/or flash memory and/or RAM and/or ROM and/or EPROM and/or EEPROM and/or buffer memory and/or cache memory and/or a database and/or an electrical or optical signal.

An arrangement comprising at least one wireless device as described herein and one network node as described herein is proposed as well. The arrangement may in particular carry out any method described herein or any combination of methods described herein, e.g. any of the methods for operating a wireless device and/or any of the methods for operating a network node.

Any device adapted to determine and/or provide a power report as described herein may be considered a wireless device. A network node may be any device adapted to receive a power report as described herein and/or to configure a wireless device based on a power report as described herein.

The power report indicating transmission power available to the wireless device for FD communication may also be referred to as FD power report, or alternatively as FD-PHR if it is implemented as Power Headroom Report.

Determining the power report generally may be based on current scheduling or operation, in particular pertaining to transmissions by the wireless device. A current scheduling may refer to a configuration and/or communication schedule available to the wireless device, e.g. already received and/or configured and/or still stored and/or currently being processed.

Additionally or alternatively, determining the power report may be based on a self-interference suppression capability of the wireless device, in particular for the one or more FD carriers of the wireless device.

Generally, determining the power report may include determining (and/or including into the report) an indication of transmission power available to the wireless device for half-duplex communication on one or more carriers, in particular on one or more FD carriers.

The power report may indicate transmission power available to the wireless device for half-duplex communication on one or more carriers, in particular on one or more FD carriers.

It may be considered that a network node configures, and/or is adapted for configuring and/or comprises a configuring module for configuring, the wireless device with a power report configuration, which in particular may comprise one or more triggering conditions and/or providing conditions. Such configuring may be performed before determining the power report, which may be determined based upon a power report configuration.

Configuring one or more wireless devices may comprise configuring the wireless device the power report was received from for FD communication.

Determining the power report may be based upon a triggering condition and/or a network request. A triggering condition may be configured by the network and/or network node and/or be predefined, e.g. stored in a memory of the wireless device. A request may be received and/or a triggering condition checked by the wireless device, which may be adapted correspondingly and/or comprise a corresponding request receiving module and/or a triggering condition module. The network node may perform such requesting or configuring, and/or be adapted accordingly and/or comprise a corresponding requesting module and/or configuring module.

Generally, determining the power report may be performed while the wireless device operates and/or communicates using HD communication (e.g. one or more FD carrier the power report pertains to) and/or pertains to one or more carriers the wireless device may use for FD communication, but utilizes for HD communication, in particular during and/or for the determining of the power report.

In some variants, determining the power report may comprise determining an indication of transmission power available for FD communication (in particular, an FD indication) for a number of N transmission occasions. Alternatively or additionally, determining the power report may comprise determining an indication of transmission power available for HD communication (in particular, a HD power indication) for a number of M transmission occasions. N may be equal to or different from M. N and/or M may be based on and/or be defined by a configuration like a power report configuration, in particular in a configuration configured by the network or network node.

A triggering condition may comprise or define a timing, e.g. at pre-determined times or transmission occasions, and/or periodic triggering, e.g. each time after a predetermined time and/or period and/or a number of transmission occasion have occurred. A triggering condition may pertain to changes in interference on physical channels and/or PRBs scheduled and/or configured for a given duplex mode, e.g. FD communication. For example, a triggering condition may be based on measurements (which may be performed by the wireless device) of external interference, e.g. on PRBs configured or scheduled for FD communication (for example, on PRBs when FD communication occurs) and/or of interference on other PRBs. The triggering condition may be related to a change in such measurements and/or the measured interference/s, e.g. changes going beyond a pre-determined threshold. It may be conceivable that such a condition is used as a providing condition, causing providing of a report already determined, e.g. determined regularly and/or periodically; not all such reports may be provided to the network, e.g. based on providing conditions.

It may be considered that determining the power report comprises estimating and/or calculating an available transmission power, e.g. for FD communication (in particular, based on SI suppression capability of the wireless device, and optionally for HD communication.

It may be considered that configuring the one or more wireless devices may comprise configuring the one or more wireless devices with a duplex configuration and/or a power report configuration and/or conditions pertaining to the power report, e.g. triggering condition/s and/or providing conditions, and/or one or more tasks to be performed, e.g. measurement to be performed and/or additional information to report, and/or to provide a report and/or the timing of such a report, e.g. when to provide it. A duplex configuration may configure the duplex mode (FD communication and/or HD communication) to be used and/or related parameters and/or resources.

Configuring the one or more wireless devices may be based on the power report received. Optionally, the configuring may be based on measurement reports received from the wireless device, in particular measurement reports pertaining to received signals. Configuring may comprise determining a configuration. Generally, configuring the one or more wireless devices may be based on aggregate power indications, e.g. an aggregate of FD power indications (e.g. FD-PHR) and/or HD power indications (e.g. HD-PHR) over a given time, e.g. a pre-determined time interval, which may cover a plurality of transmission occasions and/or TTIs. Aggregation may comprise mathematical manipulation of indication values, e.g. adding to a total sum, determining a maximum and/or minimum and/or average, etc.

Determining the power report may generally comprise and/or the power report may include: an FD power indication, which may indicate the transmission power available for FD transmission, in particular an indication of (which may implicitly and/or explicitly indicate) the amount of power the wireless device may transmit, in full-duplex operation or communication, in particular on one or more FD carriers, e.g. in or for one or more transmission occasions;

optionally, the power report may comprise a HD power indication, indicating (e.g., implicitly or explicitly) the transmission power available for HD transmission, in particular in the one or more transmission occasions, e.g. for one or more HD carriers, which may be and/or include one or more of the one or more FD carriers; and, optionally, all of them, such that the HD power indication may pertain to the carriers which are and/or are available as and/or are switchable (e.g., by the wireless device, for example based on a configuration) between HD carrier and FD carrier; in this case, the HD power indication may pertain to additional HD carriers which only HD carriers (for the wireless device). A power report comprising both a FD power indication and a HD power indication may be called an extended power report, in particular a FD-E-PHR, if it is in the form of a PHR.

It may be envisioned that determining the power report comprises determining, and/or that the power report comprises, a request or recommendation (the wireless device may comprise a corresponding request module). The request or recommendation may indicate a preference for FD communication and/or HD communication for one or more transmission occasions (e.g., the next K>=1 transmission occasions) and/or one or more FD carriers and/or HD carriers, based on the determined transmission power/s available for HD communication or FD communication, e.g. based on a first threshold for FD communication and/or a second threshold for HD communication and/or a comparison thereof. For example, if the FD power indication corresponds to a value below the first threshold (corresponding to an available power for FD communication, e.g. 5 dB) and the HD power indication corresponds to a value reaching or above the second threshold (corresponding to an available power for HD communication, e.g., 10 dB), the request may be determined to prefer HD communication. If the FD power indication corresponds to a value reaching and/or above the first threshold (and/or the HD power indication corresponds to a value below the second threshold), a preference for FD communication may be determined. The thresholds may be determined based on the SI suppression capabilities of the wireless device.

Generally, a power indication may be provided as PHR (Power Headroom Report) value/s, e.g. indicating a difference between total power and power used and/or configured and/or scheduled. A power indication (e.g. FD power indication or HD power indication) generally may implicitly or explicitly indicate the amount of power the wireless device can transmit (also called available power for transmission) on one or more UL channels or carriers for the duplex mode the indication pertains to, in particular for one or more transmission occasions, e.g. a set of next N transmission occasions, wherein N may be 1 or larger.

A power indication, e.g. FD power indication or HD power indication, may be provided in the form of an absolute indication or value, e.g. of power or PHR, e.g. indicating dB-values, which may be indicated as integer values. Such an absolute value may e.g. indicate a power indication for FD and HD separately, e.g. FD power indication=25 dB; HD power indication=30 dB; both may generally be PHR values). Alternatively or additionally, a FD power indication and/or a HD power indication may be expressed or provided relative to each other, wherein one may be used as an (absolute) reference value. For example, a FD power indication for the above example may indicate FD power indication=25 dB, HD power indication=+5 dB (referring to FD). The format or expression may be pre-determined, e.g. by a standard. This may lower signaling overhead.

It may be considered that a power report indicating something comprises a corresponding indication, e.g. a FD power indication for indicating a transmission power available for FD communication. A power report generally may comprise an indication of the number of and/or the identity of UL channels and/or PRBs and/or carriers and/or transmission occasions the wireless device is capable to transmit in FD communication and/or HD communication, in particular pertaining to the transmission occasion/s the FD power indication and/or HD power indication pertain to. The power report may comprise one or more indications indicating the relative number of the number UL physical channels and/or PRBS and/or carriers the wireless device may transmit in FD communication and HD communication, e.g. a number for FD communication as a reference, and a number for HD communication relative to this reference (e.g. 10 PRBS for FD communication and 2 less for HD communication). It may be considered that for such relative indicating a reference is provided by a transmission occasion, e.g. a previous transmission occasion. In such cases, both FD power indication and HD power indication may be relative to the reference. In this manner, the signaling required may be limited.

A power indication (e.g. HD power indication or FD power indication) may generally be provided relative to a reference value, which may be another power indication (e.g. pertaining to another duplex mode), a pre-defined reference and/or pertaining to a transmission occasion, e.g. a previous transmission occasion.

Providing the power report may be dependent and/or based on one or more providing conditions, e.g. whether a threshold and/or difference threshold is reached. In particular, providing the power report indicating the transmission power available for FD communication and/or a FD power indication may be based on the available power determined for FD communication or the corresponding indication reaching a pre-determined threshold (e.g. 10 dB). If such a threshold is not reached, providing the power report may be cancelled and/or may comprise providing a HD power indication (without FD power indication) and/or may comprise providing an indication that the threshold has not been reached. The threshold may be configured or configurable by the network or network node, or may be pre-determined.

Alternatively or additionally, providing the power report may be based on a comparison of and/or a difference between the determined transmission power available for FD and the determined transmission power available for HD (comparing may be performed regarding the same carriers; corresponding power indications may be compared). The providing may be performed based on the difference (which may be taken as an absolute positive value) reaching a threshold (which may be called difference threshold), which may be configured or configurable (e.g., as above) or pre-determined. In particular, providing may be performed such that if the difference threshold is reached (e.g., the transmission power available for FD is sufficiently smaller that the transmission power available for HD). The thresholds may be configured as providing conditions, e.g. with a power report configuration.

Providing the power report may comprise that, if the difference threshold is not reached, only one power indication is provided (instead of a FD power indication and a HD power indication). This power indication may be the FD power indication or the HD indication and/or be based on either or both. For example, this power indication may be determined to be the average of FD power indication and HD power indication.

In some variants, providing the power report may utilize a physical uplink channel, in particular a control channel.

Providing may be performed using HD communication, which may facilitate improved signaling, in particular with higher transmission power than in FD communication.

Configuring the one or more wireless device may be based on one or more power reports, which may be received from one or more wireless devices. Generally, configuring may be based on one or more power indications in the report, e.g. a FD power indication and/or a HD power indication. Configuring may in particular comprise configuring the wireless device for FD communication or HD communication on one or more carriers, in particular on one or more carriers the wireless device may use for either FD or HD communication. By basing the configuring on the power report (the FD power indication), it is possible for the network node to optimize the use of the capabilities of the wireless device. Configuring may generally be based on one or more configuration conditions, and/or may comprise determining a configuration, e.g. on such conditions. It may be considered that the HD power indication is received with a separate report, which may be provided by the wireless device independent of a report comprising a FD power indication. The separate report may pertain to a different transmission occasion, in particular pertain to a previous transmission occasion, and/or be received before the report comprising a FD power indication. Configuring based on such a separate report may include receiving such a separate report and/or requesting (by the network or network node) a power report including a FD power indication.

In some variants, the power report may comprise an indication of transmission power available for FD communication (in particular, an FD power indication) for a number of N transmission occasions. Alternatively or additionally, the power report and/or a separate power report (e.g., for HD communication) may comprise an indication of transmission power available for HD communication (in particular, a HD power indication) for a number of M transmission occasions. N may be different from M. Configuring the network node with or for a power report configuration may comprise configuring and/or defining N and/or M.

It may be considered that configuring may be based on capability information, which the network node or network may have received from the wireless device and/or another node, e.g. before configuring and/or for registering the wireless device. The network node may register, and/or be adapted for registering and/or comprise a registering module for registering, capability information pertaining to the wireless device, in particular information pertaining to its (duplex) mode capabilities. Registering may comprise receiving, e.g. from the wireless device, and/or storing such information.

Configuring may comprise determining and/or configuring a configuration for or with a duplex mode, e.g. FD communication or HD communication, in particular for one or more of the FD carriers of a wireless device. Related configuration conditions may for example pertain to a threshold for the FD power indication received with the power report; for example, FD communication may be configured based upon the FD power indication reaching at least a predetermined threshold, e.g. corresponding to a threshold available power, e.g. 10 dB. The condition may be independent of the HD power indication. Another configuration condition may be such that the duplex mode having associated to it the larger or highest available power and/or PHR, e.g. as indicated by the power report received, is configured. Alternatively or additionally, a configuration condition may be based on an uplink data buffer fill level of the wireless device, e.g. compared to a buffer level threshold. In one alternative, the duplex mode with the larger or highest value of PHR (or available power) may be used if the buffer fill level reaches a buffer level threshold. The buffer fill level may be included in the power report. Configuring may generally include configuring the duplex mode (e.g., as chosen above) in more detail, e.g. configuring a specific duplex mode like HD-TDD or HD-FDD (e.g., if two or more carriers are available).

Configuring may comprise configuring one or more uplink radio transmission parameters, e.g. pertaining to the configured duplex mode or specific mode. Such parameters may comprise, e.g., uplink transmit power for uplink transmission on one or more channels (e.g. data channel/s, control channel/s, etc.), and/or one or more uplink physical channels and/or PRBs for uplink transmissions, and/or modulation and coding schemes for uplink transmission.

Configuring for or with a duplex mode may be based on duplex criteria, which may comprise e.g. the physical channels and/or PRBs available for scheduling the wireless device/s to be configured for HD communication or FD communication. For example, with a limited number of PRBs available, the configuration may be determined to require the lowest number PRBs, e.g. using FD communication (which uses a PRB in both directions). Another duplex criterion may be based on the amount of traffic of the wireless device/s, in particular UL traffic. The traffic may be based on a buffer fill level of the wireless device. It may be considered that the configuration is determined or configured based on the buffer fill level and/or whether the buffer fill level at least reaches a buffer threshold or not. For example, the duplex mode allowing transmittance of the largest amount of data may be configured if the buffer threshold is reached. Duplex criteria may be based on Quality of Service (QoS) conditions, e.g. required (or maximum allowed) delay, type of service, etc. For example, the configuration may configure FD for shorter required delay, e.g. a round trip time (RRT) below a RTT threshold).

The network node (e.g. eNB) may select between HD and FD communication (as described above) based on FD-E-PHR reports on a suitable time scale. The shortest time scale can be L number of transmission occasions e.g. L number of TTIs (Transmission Time Interval). More specifically, such decision can be based on a longer time scale that matches the time scale of both the FD-E-PHR reporting rate or period (TO) and the signal measurements (e.g. RSRP/RSRQ/RSSI used for mobility) reporting interval (e.g. L=200 ms . . . 500 ms). In this case, configuring the wireless device and/or determining a configuration for a duplex mode may be based on aggregate values of FD power indications (e.g. FD-PHR) and HD power indication (e.g. HD-PHR) over an averaging period (TO). These aggregate values are typically obtained by the network node from individual values of FD-E-PHR reported by the UE over the averaging period (TO) by using a suitable function. Examples of functions are maximum, minimum, mean, xth percentile.

Figure 2:
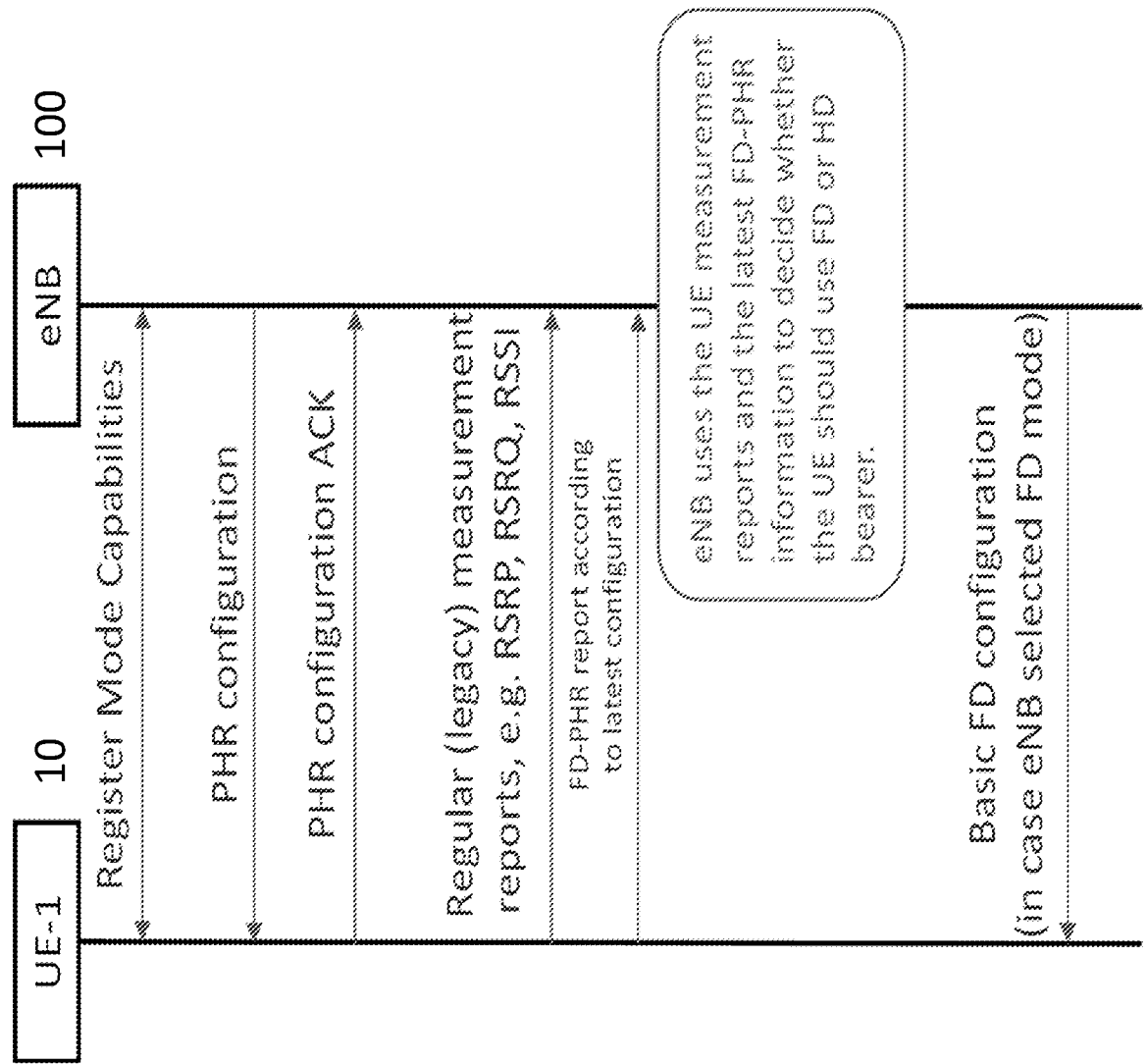
FIG. 2 a flow diagram pertaining to providing a power report.

Within such an interval (e.g. L=200 ms) over which either FD or HD is used, the TTI level scheduling may take into account the HD vs FD decision on the coarse time scale. When the network node (e.g. eNB) makes such a decision, at that time, it also may send the basic FD or HD configuration parameters to the UE as shown in FIG. 2. The UE may also be pre-configured with configuration parameters associated with FD and HD communication. In this case the network node may only send an indicator (e.g. 0=FD communication/mode; 1=HD communication/mode) and if needed additional parameters to the UE to start operation using the selected duplex modes.

FIG. 2 shows an example of signaling between a wireless device 10 (UE-1) and a network node 100 (in the example, an eNB). The wireless device may transmit capability information to the network node for registering. The network node may perform registering and/or confirm and/or acknowledge a corresponding registering. Then, the network node may configure the wireless device with a power report configuration, e.g. a PHR configuration indicating a Power Headroom Report, according to which the power report may comprise a PHR structure. The power report configuration may generally configure one or more triggering conditions and/or the type of power report to be sent, e.g. depending on providing conditions.

The wireless device may respond with acknowledgement signaling (ACK). The wireless device may provide one or more reports concerning measurements for example pertaining to received signals, e.g. RSRP (Reference Signal Received Power, RSRQ (Reference Received Signal Received Quality), and/or RSSI (Received Signal Strength Indicator). Then it provides a power report with FD power indication (as FD-PHR report) based upon its configuration. It may be considered that the report/s regarding measurements are included in the power report with FD power indication. The network node may determine a configuration for the wireless device based on the report/s, in particular based on the FD-PHR report and the measurement reports. In particular, the network node may decide for which duplex mode the wireless device is to be configured; in this context, a request or recommendation in the power report may be considered. Based on such determination, the network node may configure the wireless device, for example with a basic FD configuration for FD communication, should it decide or select that the wireless device is to utilize FD communication on one or more carriers.

Figure 3:
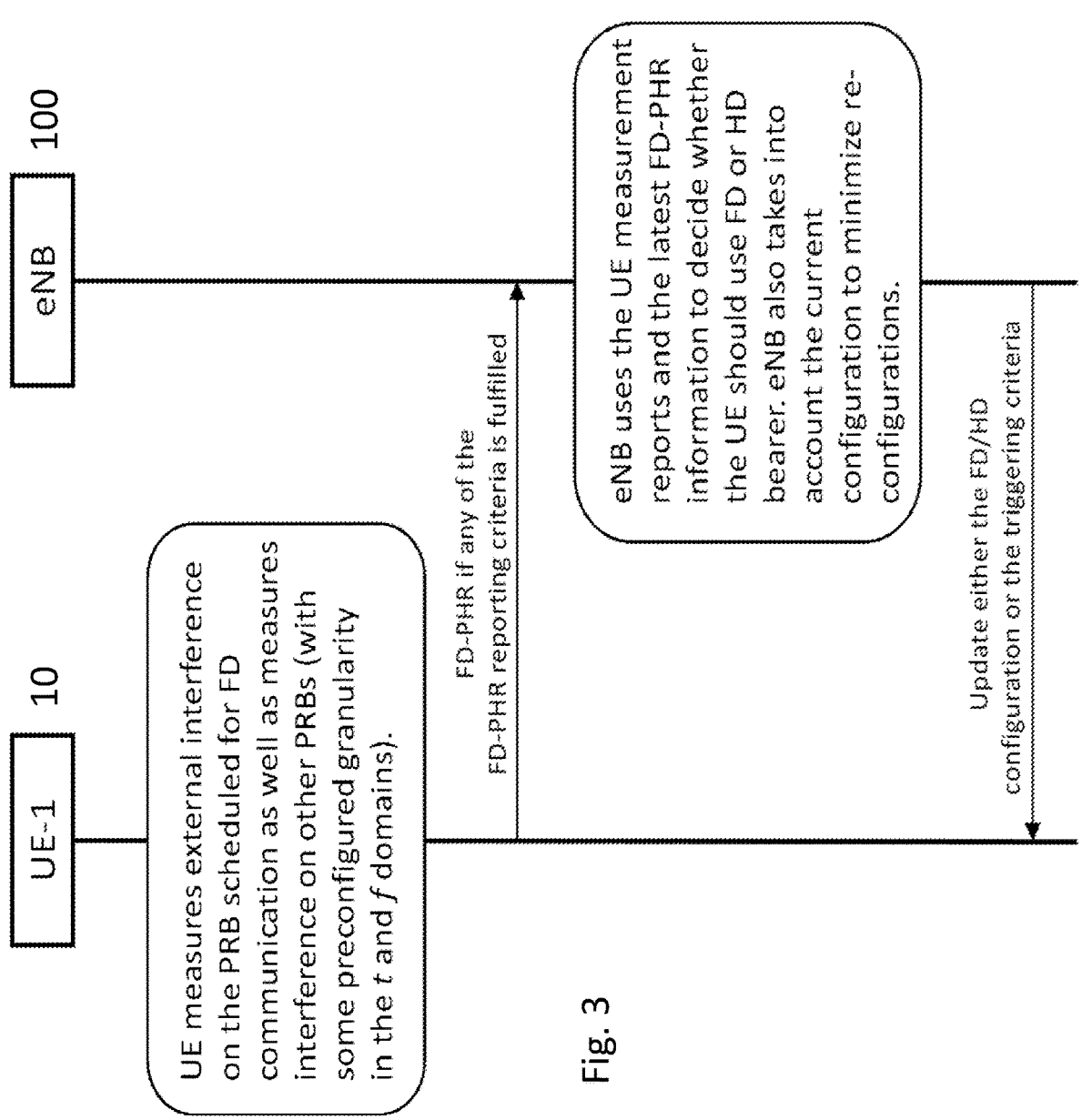
FIG. 3 another flow diagram pertaining to providing a power report.

FIG. 3 shows additional details regarding the wireless device's actions. The wireless device measures external interference on one or more PRBs scheduled for FD communication, as well as measures interference on other PRBs (there may be some granularity for time and frequency, which may group several time units and/or frequency units like carriers or subcarriers).

Figure 4:
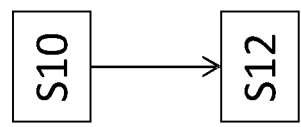
FIG. 4 a method performed by a wireless device.

FIG. 4 shows a method for operating a wireless device, e.g. a wireless device 10 as described herein. In action S10, the wireless device determines a power report indicating transmission power available to the wireless device for FD communication on at least one of the FD carriers. In action S12, it provides the power report to the wireless communication network it is connected to, e.g. to a network node, in particular via a wireless transmission.

Figure 5:
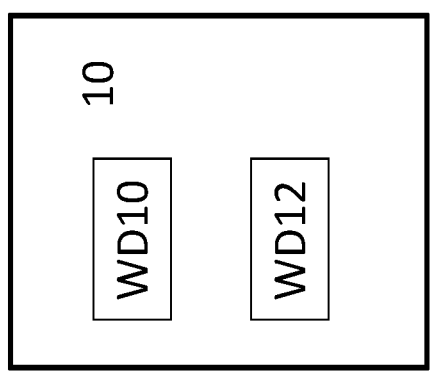
FIG. 5 an example for a wireless device.

FIG. 5 shows an example of a wireless device 10. The wireless device 10 may comprise a power report module WD10 for performing action S10. The wireless device 10 may further comprise a reporting module WD12 for performing action S12.

Figure 6:
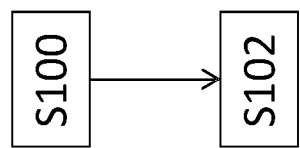
FIG. 6 a method performed by a network node.

FIG. 6 shows a method for operating a network node, e.g. a network node 100 as described herein. In action SN 100, the network node may receive, e.g. from a wireless device, a power report, the power report indicating a transmission power available to the wireless device for full-duplex communication, FD communication, on one or more carriers, FD carriers. In action SN 102, the network node may configure one or more wireless devices for communication based on the power report.

Figure 7:
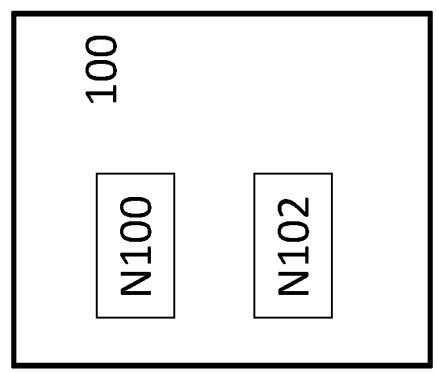
FIG. 7 an example for a network node.

FIG. 7 shows an example of a network node, e.g. a network node 100 as described herein. The network node 100 may comprise a report receiving module N100 for performing action S100. The network node 10 may further comprise configuring module N102 for performing action S102.

Figure 8:
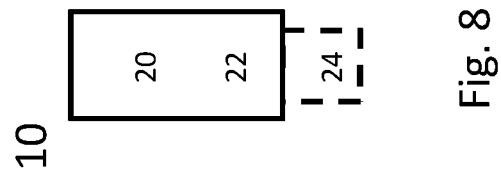
FIG. 8 another example for a wireless device.

FIG. 8 schematically shows a wireless device 10, which may be implemented in this example as a user equipment. Wireless device 10 comprises control circuitry 20. Wireless device 10 also comprises radio circuitry 22 providing receiving and transmitting or transceiving functionality, the radio circuitry 22 being connected or connectable to the control circuitry 20. The radio circuitry 22 and/or the control circuitry may be adapted and/or operably connected to provide FD communication capability for one or more FD carriers, and optionally HD communication capability one or more HD carriers, which may include one or more of the FD carriers.

The wireless device (e.g. the control circuitry or a module thereof) may be adapted to switch or select between FD communication and HD communication for such carriers. An antenna circuitry 24 of the wireless device 10 is connected or connectable to the radio circuitry 22 to collect or send and/or amplify signals. Radio circuitry 22 and the control circuitry 20 controlling it are configured for cellular communication with a network or a network node using the HD communication or FD communication. The wireless device 10 may be adapted to carry out any of the methods for operating a wireless device disclosed herein; in particular, it may comprise corresponding circuitry, e.g. control circuitry. Modules or functionality of a wireless device as described herein may be implemented in software and/or hardware and/or firmware in corresponding circuitry.

Figure 9:
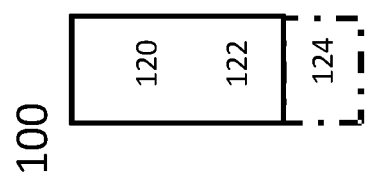
FIG. 9 another example for a network node.

FIG. 9 schematically show a network node, in this case a base station 100, which in particular may be an eNodeB. Network node 100 comprises control circuitry 120. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. Modules or functionality of a network node as described herein may be implemented in software and/or hardware and/or firmware in corresponding circuitry.

Generally, control circuitry may comprise integrated circuitry for processing and/or control, e.g. one or more processors and/or processor cores and/or FPGAs (Field Programmable Gate Array) and/or ASICs (Application Specific Integrated Circuitry). Control circuitry may comprise and/or be connected to and/or be adapted for accessing (e.g. writing to and/or reading from) memory, which may comprise any kind of volatile and/or non-volatile memory, e.g. cache and/or buffer memory and/or RAM (Random Access Memory) and/or ROM (Read-Only Memory) and/or optical memory and/or EPROM (Erasable Programmable Read-Only Memory). Such memory may be adapted to store code executable by control circuitry and/or other data, e.g. data pertaining to communication, e.g. configuration/s and/or address data of nodes, etc.

Radio circuitry may comprise receiving circuitry (e.g. one or more receivers) and/or transmitting circuitry (e.g. one or more transmitters). Alternatively or additionally, radio circuitry may comprise transceiving circuitry for transmitting and receiving (e.g. one or more transceivers). Antenna circuitry may comprise one or more antennas or antenna elements, which may be arranged in an antenna array.

A configuration, e.g. a configuration of a wireless device, may generally be described and/or represented and/or indicated by configuration data. A configuration may refer to a setup and/or operational mode of a wireless device. It may be considered that a configuration defines and/or sets one or more parameters for operation, e.g. one or more of parameters pertaining to carrier/s used for communication, resources to be used, types of communication (e.g., transmission, reception, FD, HD, . . . ), timing of tasks (e.g. periodically, which may include defining the period, or pre-determining fixed timings or timing ranges), conditions triggering tasks, tasks to be performed, power settings (e.g. regarding transmission power), transmission or reception settings (e.g. modulation, beam forming, usage of antennas), etc.

Configuring a wireless device may refer to the wireless device being adapted or caused or set to operate according to the configuration. Configuring may be done by another device, e.g. a network node or network, in which case it may comprise transmitting configuration data to the wireless device to be configured. Such configuration data may represent the configuration to be configured and/or comprise one or more instruction pertaining to a configuration. A wireless device may configure itself, e.g. based on configuration data received from a network or network node. Generally, configuring may include determining configuration data representing the configuration and providing it to one or more other nodes (parallel and/or sequentially), which may transmit it further to the wireless device (or another node, which may be repeated until it reaches the wireless device). Alternatively or additionally, configuring a wireless device, e.g. by a network node or other device, may include receiving configuration data and/or data pertaining to configuration data, e.g. from another node like a network node, which may be a higher-level node of the network, and/or transmitting received configuration data to the wireless device. Accordingly, determining a configuration and transmitting the configuration data to the wireless device may be performed by different network nodes or entities, which may be able to communicate via a suitable interface, e.g. an X2 interface in the case of LTE. Configuring a wireless device for communication may pertain to configuring the wireless device for any kind of operation and/or with any kind of parameters pertaining to any form of communication the wireless device is adapted to perform, e.g. pertaining to duplex mode, and/or MCS, and/or (measurement) reporting and/or scheduling or use of resources. For example, any configuring, in particular performed by a network node, described herein may be considered configuring for communication.

A storage medium may be adapted to store data and/or store code executable by control circuitry and/or a computing device, the instruction causing the control circuitry and/or computing device to carry out and/or control any one of the methods described herein when executed by the control circuitry and/or computing device.

Determining a power report may generally comprise determining information for the power report and/or including an indication of such information, e.g. suitable corresponding parameters or flags, into the report. The report may be provided in the form of signals and/or as one or more messages transmitted wirelessly, e.g. via a suitable channel, for example a physical channel and/or an uplink control channel, and/or using correspondingly configured uplink resources.

A power report including specific information or a corresponding indication implies that a corresponding determining and/or including has been performed. Determining a power report, and/or information or corresponding indications, may generally comprise performing corresponding measurements suitable to determine the information and/or obtaining the corresponding information, e.g. by reading it from a memory or table, and/or receiving the information.

Determining something, e.g. determining the power report, may include performing calculations and/or estimating based on information obtained, e.g. based on measurement results, and/or may comprise transforming and/or compressing information into other forms of information or indications. An indication of an information may allow determining the information based on the information, e.g. by performing extraction and/or calculation and/or comparison (e.g. with a table) based on the indication.

Resources or communication resources or radio resources may generally be frequency and/or time resources (which may be called time/frequency resources). A resource may be a PRB (Physical Resource Block) and/or comprise more than one PRB. A PRB may be identified and/or comprise a combination of time/frequency resources, which may combine to a PRB as smallest defined resource unit (in particular time/frequency resource unit). Resources, in particular configured or scheduled resources, may be frequency-related, in particular regarding one or more carriers and/or subcarriers, and/or time-related, in particular regarding frames and/or slots and/or subframes, and/or pertain to resource blocks and/or time/frequency hopping, in particular pertaining to transmission or reception, e.g. by a wireless device.

Transmission from a wireless device may generally be referred to as uplink (UL) transmission, in particular if targeted at the network or network node. Transmission to a wireless device may generally be referred to as downlink (DL) transmission, in particular if originating from a network or network node. For direct communication between wireless devices (D2D communication), resources (e.g. frequency resources) usually used for UL or DL may be used, wherein UL resources may be preferred. An uplink resource may be a resource configured or scheduled for UL transmission. A DL resource may be a resource scheduled for DL transmission (or, from the wireless device's point of view, for reception. In FD communication, a resource, in particular one or more PRBs, may be configured for both uplink and downlink transmissions (simultaneously).

Transmitting on configured or allocated resources and/or utilizing configured allocated resources (e.g., by a wireless device) may comprise transmitting data on these resources, e.g. on the frequency and/or subcarrier and/or carrier and/or timeslots or subframes of the resources.

A transmission occasion may generally be any resource configured and/or scheduled for transmission, in particular for transmission by the wireless device. A transmission occasion may in particular refer to a time-resource (unit or interval) or frequency resource or time-frequency resource, which may be pre-defined by a standard. A transmission occasion may comprise and/or cover and/or be e.g. a symbol, slot, subframe, set or group of PRBs or symbols or slots or subframes, one or more channels, in particular physical channels. A transmission occasion may comprise one or more of the corresponding time intervals and/or frequency resources, e.g. carrier or subcarriers.

Scheduling resources, e.g. by a network node like a base station or eNodeB (eNB) may comprise distributing and/or assigning resources for communication (e.g. for transmission and/or reception) to one or more wireless device or to one or more resource pools, e.g. pools for D2D communication, and/or determining corresponding configuration data. Configuring a wireless device may comprise scheduling resources, in particular for the configured wireless device.

Generally, "duplex mode" may be used as a general term for FD mode and HD mode. Communication on or using a duplex mode and operation or operating in a duplex mode may be used exchangeably. Transmitting something may comprise signaling; in particular, configuring a wireless device by the network or a node (different from the wireless device) may comprise signaling, e.g. sending a message indicating the configuration and/or signaling a configuration or indication thereof.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

LIST OF REFERENCE NUMERALS 10 wireless device
20 control circuitry
22 radio circuitry
24 antenna circuitry
100 network node
120 control circuitry
122 radio circuitry
124 antenna circuitry

The invention claimed is:

1. A method for operating a wireless device of a wireless communication network, the wireless device being capable of half-duplex (HD) communication and full-duplex (FD) communication on one or more carriers, the method comprising:
determining a power report indicating transmission power available to the wireless device for the FD communication on the one or more carriers, wherein the FD communication on the one or more carriers comprises simultaneous transmission and reception on the one or more carriers, wherein the power report comprises a recommendation that indicates a preference for the FD communication;
providing the power report to the wireless communication network, wherein the power report is provided to the wireless communication network, when the transmission power available to the wireless device for the FD communication reaches a predetermined threshold;
receiving a power report configuration from the wireless communication network; and
in response to receiving the power report configuration from the wireless communication network, transmitting acknowledgment (ACK) signaling to the wireless communication network.

2. The method according to claim 1, wherein determining the power report is based on current scheduling or operation pertaining to transmissions by the wireless device.

3. The method according to claim 1, wherein determining the power report is based on a self-interference suppression capability of the wireless device for the one or more carriers of the wireless device.

4. The method according to claim 1, wherein determining the power report includes determining an indication of transmission power available to the wireless device for the HD communication on the one or more carriers, and wherein the one or more carriers are FD carriers.

5. The method of claim 1, wherein the one or more carriers are available for the HD communication and the FD communication, and wherein the wireless device switches between the HD communication and the FD communication on the one or more carriers based on the power report configuration.

6. A wireless device for a wireless communication network, the wireless device being configured for half-duplex (HD) communication and full-duplex (FD) communication on one or more carriers, the wireless device further being configured to:
determine a power report indicating transmission power available to the wireless device for the FD communication on the one or more carriers, wherein the FD communication on the one or more carriers comprises simultaneous transmission and reception on the one or more carriers wherein the power report comprises a recommendation that indicates a preference for the FD communication;
provide the power report to the wireless communication network, wherein the wireless device provides the power report to the wireless communication network, when the transmission power available to the wireless device for the FD communication reaches a predetermined threshold;
receive a power report configuration from the wireless communication network; and in response to the reception of the power report configuration from the wireless communication network, transmit acknowledgment (ACK) signaling to the wireless communication network.

7. The wireless device according to claim 6, wherein the power report is based on current scheduling or operation pertaining to transmissions by the wireless device.

8. The wireless device according to claim 6, wherein the determination of the power report is based on a self-interference suppression capability of the wireless device for the one or more carriers of the wireless device.

9. The wireless device according to claim 6, wherein the power report indicates transmission power available to the wireless device for the HD communication on the one or more carriers, and wherein the one or more carriers are FD carriers.

10. A method for operating a network node of a wireless communication network, the method comprising:
receiving, from a wireless device, a power report, the power report indicating a transmission power available to the wireless device for full-duplex (FD) communication on one or more carriers, wherein the FD communication on the one or more carriers comprises simultaneous transmission and reception on the one or more carriers, wherein the power report comprises a recommendation that indicates a preference for the FD communication, and wherein the wireless device provides the power report to the network node, when the transmission power available to the wireless device for the FD communication reaches a predetermined threshold;
configuring the wireless device for communication based on the power report; and
in response to configuring the wireless device, receiving acknowledgment (ACK) signaling from the wireless device.

11. The method according to claim 10, wherein the power report indicates transmission power available to the wireless device for half-duplex (HD) communication on the one or more carriers, and wherein the one or more carriers are FD carriers.

12. The method according to claim 11, wherein configuring the wireless device further comprises configuring the wireless device with conditions pertaining to the power report.

13. The method according to claim 10, wherein configuring the wireless device further comprises configuring the wireless device based on measurement reports received from the wireless device.

14. A network node for a wireless communication network, the network node being configured to:
receive, from a wireless device, a power report, the power report indicating a transmission power available to the wireless device for full-duplex (FD) communication on one or more carriers, wherein the FD communication on the one or more carriers comprises simultaneous transmission and reception on the one or more carriers, wherein the power report comprises a recommendation that indicates a preference for the FD communication, and wherein the wireless device provides the power report to the network node, when the transmission power available to the wireless device for the FD communication reaches a predetermined threshold;
configure the wireless device for communication based on the power report; and
in response to the configuration of the wireless device, receive acknowledgment (ACK) signaling from the wireless device.

15. The network node according to claim 14, wherein the power report indicates a transmission power available to the wireless device for half-duplex (HD) communication on the one or more carriers, and wherein the one or more carriers are FD carriers.

16. The network node according to claim 14, wherein the network node is further configured to configure the wireless device based on measurement reports received from the wireless device.

17. The network node according to claim 14, wherein the network node is further configured to configure the wireless device with conditions pertaining to the power report.

18. A computer program product comprising code stored on a non-transitory storage medium and executable by control circuitry, the code causing the control circuitry to control and/or perform the method of claim 1 when executed by the control circuitry.

* * * * *